United States Patent
You et al.

(10) Patent No.: US 9,781,615 B2
(45) Date of Patent: Oct. 3, 2017

(54) LINK ADAPTATION AND DEVICE IN ACTIVE SCANNING METHOD

(71) Applicant: LG ELECTRONICS INC., Seoul (KR)

(72) Inventors: Hyang Sun You, Anyang-si (KR); Yong Ho Seok, Anyang-si (KR); Jong Hyun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 142 days.

(21) Appl. No.: 14/350,762

(22) PCT Filed: Oct. 22, 2012

(86) PCT No.: PCT/KR2012/008640
§ 371 (c)(1),
(2) Date: Apr. 9, 2014

(87) PCT Pub. No.: WO2013/069906
PCT Pub. Date: May 16, 2013

(65) Prior Publication Data
US 2014/0247746 A1    Sep. 4, 2014

Related U.S. Application Data

(60) Provisional application No. 61/556,756, filed on Nov. 7, 2011.

(51) Int. Cl.
*H04W 48/16*    (2009.01)
*H04W 24/06*    (2009.01)

(52) U.S. Cl.
CPC .......... *H04W 24/06* (2013.01); *H04W 48/16* (2013.01)

(58) Field of Classification Search
CPC . H04W 24/06; H04W 48/16; H04W 72/1242; H04W 72/1231; H04W 8/205; H04W 8/26; H04W 8/186; H04B 7/0452
See application file for complete search history.

(56) References Cited

U.S. PATENT DOCUMENTS

| 7,885,680 B2 | 2/2011 | Larsson | |
| 2004/0236851 A1* | 11/2004 | Kuan | H04L 12/26 709/224 |

(Continued)

FOREIGN PATENT DOCUMENTS

WO    WO 2013062586 A1 *    5/2013    ............ H04W 76/02

*Primary Examiner* — Redentor Pasia
*Assistant Examiner* — Peter Mak
(74) *Attorney, Agent, or Firm* — Lee, Hong, Degerman, Kang & Waimey

(57) ABSTRACT

Disclosed are a link adaptation method and device in an active scanning method. The link adaptation method transmits a the probe request frame comprising null data packet announcement (NDPA) information elements, transmits a null data packet (NDP) frame comprising only a physical layer convergence protocol (PLCP) header after transmitting the probe request frame, and receives a the probe response frame comprising feedback information elements measured based on the NDP frame. Therefore, the invention is capable of improving data transmission efficiency by using a modulation coding scheme (MCS) suitable for a channel state from initial connection.

10 Claims, 12 Drawing Sheets

(56) References Cited

U.S. PATENT DOCUMENTS

| | | | |
|---|---|---|---|
| 2007/0002742 A1* | 1/2007 | Krishnaswamy | H04W 72/1242 370/235 |
| 2007/0036353 A1* | 2/2007 | Reznik et al. | 380/30 |
| 2010/0238879 A1 | 9/2010 | Jeon et al. | |
| 2011/0199968 A1* | 8/2011 | Kim | H04B 7/0617 370/328 |
| 2011/0273977 A1* | 11/2011 | Shapira | H04B 7/0452 370/208 |
| 2011/0274054 A1 | 11/2011 | Cordeiro | |
| 2012/0051246 A1* | 3/2012 | Zhang | H04L 1/0001 370/252 |
| 2012/0051351 A1 | 3/2012 | Lee et al. | |
| 2012/0099664 A1* | 4/2012 | Cheong et al. | 375/259 |
| 2013/0058273 A1* | 3/2013 | Wentink | H04B 7/0452 370/328 |
| 2013/0208606 A1* | 8/2013 | Merlin | H04L 1/0025 370/252 |

\* cited by examiner

LINK ADAPTATION AND DEVICE IN ACTIVE SCANNING METHOD

CROSS-REFERENCE TO RELATED APPLICATIONS

This application is the National Stage filing under 35 U.S.C. 371 of International Application No. PCT/KR2012/008640, filed on Oct. 22, 2012, which claims the benefit of U.S. Provisional Application Ser. Nos. 61/556,756, filed on Nov. 7, 2011, the contents of which are all hereby incorporated by reference herein in their entirety.

BACKGROUND OF THE INVENTION

Field of the Invention

The present invention relates to wireless communication and, more particularly, to a method and apparatus for performing link adaptation.

Related Art

A Machine-to-Machine (M2M) system has recently been in the spotlight as the next-generation communication technology. In the IEEE 802.11 WLAN, a new standard is being established in order to support M2M. An M2M system means a network over which a machine not a human being becomes the main body of communication and exchanges pieces of information. A temperature sensor, a humidity sensor, a camera, home appliances, such as TV, a process machine in a factory, or a large-sized machine, such as a vehicle, may become one of the elements of an M2M system. With the recent advent of various communication services, such as smart grid, e-Health, and ubiquitous, M2M technology is used a lot in order to support the various communication services. An M2M system has the following characteristics.

1) A very large number of STAs: M2M assumes a very large number of STAs unlike an existing network. This is because not only machines owned by persons, but also sensors installed in homes and companies must be taken into consideration. Accordingly, a very large number of STAs may be connected to one AP.

2) Low traffic load per STA: An M2M terminal has a traffic pattern in which surrounding information is collected and reported. Accordingly, information does not need to be frequently transmitted, and the amount of the information is small.

3) Uplink-oriented: M2M is chiefly configured to receive a command in downlink, take action, and then report resulting data in uplink. Thus, uplink becomes the center in M2M because major data is commonly transmitted in uplink.

4) Longer lifespan of an STA: An M2M terminal is chiefly operated by the battery, and a user may not frequently charge the M2M terminal Accordingly, it is necessary to guarantee a longer life span by minimizing the consumption of the battery.

5) Automatic recovery function: An M2M terminal needs an automatic recovery function because it is difficult for a person to directly manipulate the M2M terminal in a special situation.

SUMMARY OF THE INVENTION

An object of the present invention is to provide a link adaptation method between an STA and an AP in a WLAN system.

Another object of the present invention is to provide an apparatus for performing a link adaptation method between an STA and an AP.

A link adaptation method according to an aspect of the present invention for achieving the aforementioned objects of the present invention includes steps of transmitting a probe request frame including a Null Data Packet Announcement (NDPA) information element, transmitting a Null Data Packet (NDP) frame including only a Physical Layer Convergence Protocol (PLCP) header after transmitting the probe request frame, and receiving a probe response frame including a feedback information element computed based on the NDP frame, wherein the NDPA information element may include NDP information indicating whether or not the probe request frame plays a role as the NDPA frame, and the feedback information element may include at least one of Modulation and Coding Scheme (MCS) feedback information and sounding feedback information.

The link adaptation method may further including steps of receiving the NDP frame after receiving the probe response frame if the probe response frame may include the NDPA information element and transmitting an authentication request frame including the feedback information element based on the NDP frame, wherein the feedback information element may include at least one of the MCS feedback information and the sounding feedback information. The NDPA information element may further include a feedback type, beamforming, and an Nc index, the feedback type may be an indicator indicating whether the feedback information is transmitted to a single user or transmitted to multiple users, the beamforming may be an indicator indicating whether or not beamforming is performed, and the Nc index may be an indicator indicative of a feedback dimension required when the beamforming is used. The MCS feedback information may include the number of spatial streams and an MCS index, the number of spatial streams may be an indicator indicative of the number of spatial streams used in transmission, and the MCS index may be an indicator indicative of an MCS used in transmission. The sounding feedback information may include a compressed beamforming report, and the compressed beamforming report may include the Signal to Noise Ratio (SNR) of each spatial stream and at least one beamforming matrix. The link adaptation method may further include a step of transmitting an authentication request frame according to a Multiple Input Multiple Output (MIMO) transmission method using beamforming based on the MCS feedback information.

A wireless terminal according to an aspect of the present invention for achieving the aforementioned objects of the present invention includes a transceiver. The transceiver is implemented to transmit a probe request frame including a Null Data Packet Announcement (NDPA) information element, transmit a Null Data Packet (NDP) frame including only a Physical Layer Convergence Protocol (PLCP) header after transmitting the probe request frame, and receive a probe response frame including a feedback information element computed based on the NDP frame, wherein the NDPA information element may include NDP information indicating whether or not the probe request frame plays a role as the NDPA frame, and the feedback information element may include at least one of Modulation and Coding Scheme (MCS) feedback information and sounding feedback information.

The transceiver may be implemented to receive the NDP frame after receiving the probe response frame if the probe response frame may include the NDPA information element and transmit an authentication request frame including the feedback information element based on the NDP frame, wherein the feedback information element may include at least one of the MCS feedback information and the sounding feedback information. The NDPA information element may further include a feedback type, beamforming, and an Nc index, the feedback type may be an indicator indicating whether the feedback information is transmitted to a single user or transmitted to multiple users, the beamforming may be an indicator indicating whether or not beamforming is performed, and the Nc index may be an indicator indicative of a feedback dimension required when the beamforming is used. The MCS feedback information may include the number of spatial streams and an MCS index, the number of spatial streams may be an indicator indicative of the number of spatial streams used in transmission, and the MCS index may be an indicator indicative of an MCS used in transmission. The sounding feedback information may include a compressed beamforming report, and the compressed beamforming report may include the Signal to Noise Ratio (SNR) of each spatial stream and at least one beamforming matrix. The transceiver may be implemented to transmit an authentication request frame according to a Multiple Input Multiple Output (MIMO) transmission method using beamforming based on the MCS feedback information.

In accordance with the link adaptation method and the apparatus using the method in accordance with embodiments of the present invention, an STA initially performs link adaptation using management frames transmitted in scanning/authentication/association processes, thereby being capable of improving data transmission efficiency using a Modulation and Coding Scheme (MCS) suitable for channel conditions from initial connection.

DESCRIPTION OF EXEMPLARY EMBODIMENTS

Hereinafter, IEEE 802.11 used in an embodiment of the present invention means IEEE P802.11ac™/D2.0 Draft STANDARD for Information Technology Telecommunications and information exchange between systems Local and metropolitan area networks Specific requirements Part 11: Wireless LAN Medium Access Control (MAC) and Physical Layer (PHY) specifications Amendment 4: Enhancements for Very High Throughput for Operation in Bands below 6 GHz.

Furthermore, hereinafter, a link adaptation method disclosed in an embodiment of the present invention can be applied to an M2M system, but may also be additionally applied to another Wireless Local Area Network (WLAN). Furthermore, in the name of a frame or a subfield used in the link adaptation method disclosed in the present invention, the information of a subfield may be changed, added, or removed except a subfield including indication for performing an essential operation performed in the present invention.

Figure 1:
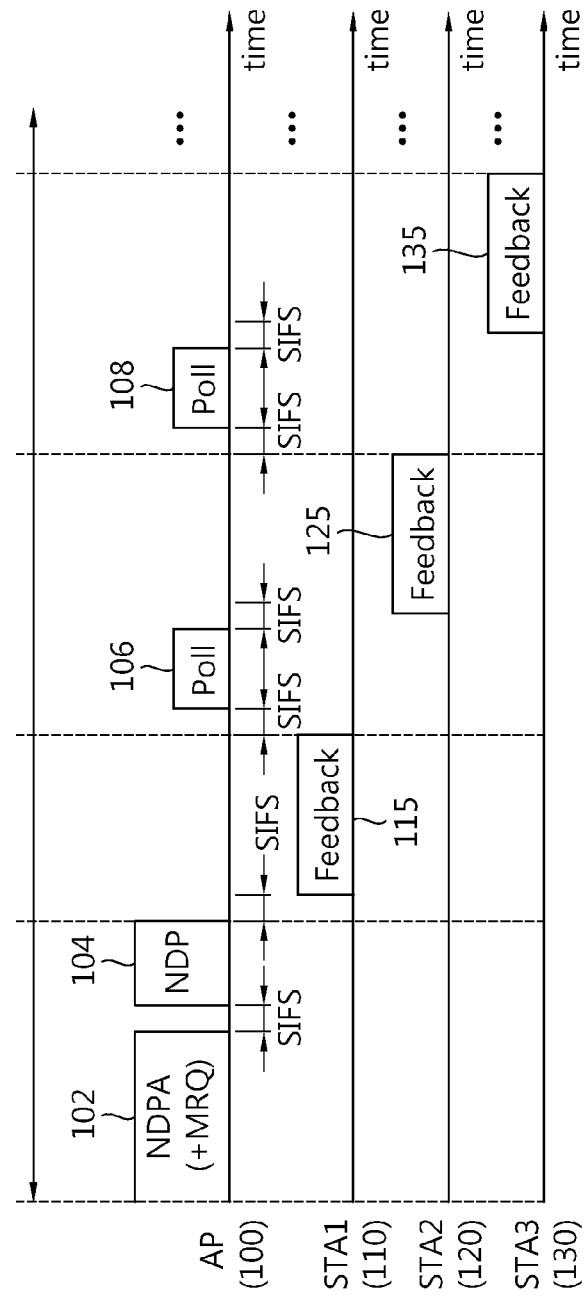
FIG. 1 is a conceptual diagram showing a method of receiving channel state information as feedback from an Access Point (AP) based on a sounding protocol.

FIG. 1 is a conceptual diagram showing a method of receiving channel state information as feedback from an Access Point (AP) based on a sounding protocol.

Referring to FIG. 1, channel state information feedback may be obtained between an AP 100 and each of STAs 110, 120, and 130 through a sounding protocol. The AP 100 may receive information about a channel state as feedback using a Null Data Packet Announcement (NDPA) frame 102 and a Null Data Packet (NDP) frame 104.

The NDPA frame 102 is a frame including information about the association identifier (AID) of an STA that will transmit the NDP frame 104, information about a feedback type, etc. The STAs 110, 120, and 130 may be prepared for CSI feedback before receiving the NDP frame 104 by sending the NDPA frame 102 prior to the transmission of the NDP frame 104. The structure of the NDPA frame 102 is described in the IEEE 802.11 8.3.1.20 paragraph.

The NDP frame 104 is a frame having a VHT PPDU structure other than data fields and is a frame transmitted after a short interface space (SIFS) after the NDPA frame 102 is transmitted.

The AP 100 may transmit the NDPA frame 102 and then transmit the NDP frame 104 after an SIFS. The first STA 110 may receive the NDP frame 104 through the NDPA frame 102 and then transmit a frame, including feedback information 115, to the AP 100 after an SIFS. The feedback information 115 may be feedback information related to an MCS, channel feedback information related to beamforming, etc.

The AP 100 may transmit a poll frame 106 in order to obtain channel information from the second STA 120. The second STA 120 that has received the poll frame 106 may transmit feedback information 125 to the AP 100. The poll frame 106 is a frame that plays the same role as the NDP frame 104, and the second STA 120 may measure a channel state based on the transmitted poll frame 106. Likewise, feedback information 135 may be generated between the AP 100 and the third STA 130 and transmitted to the AP 100.

In accordance with an embodiment of the present invention, the measurement of Channel State Information (CSI) between an AP and an STA using an NDPA frame and an NDP frame may be performed through a management frame transmitted in scanning/authentication/association processes.

A CSI measurement result using the management frame format may be used perform link adaptation after determining a Modulation and Coding Scheme (MCS). Hereinafter, in an embodiment of the present invention, a link adaptation method using a management frame transmitted in scanning/authentication/association processes is additionally described.

Figure 2:
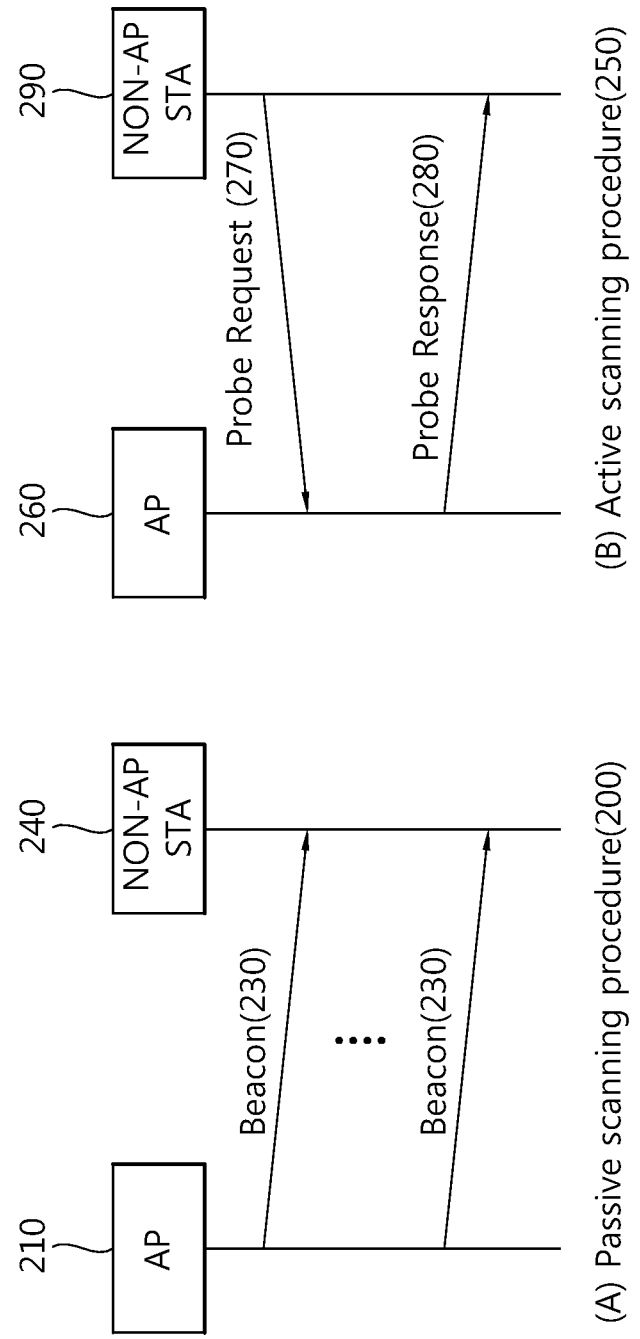
FIG. 2 is a conceptual diagram showing a scanning method in a WLAN.

FIG. 2 is a conceptual diagram showing a scanning method in a WLAN.

Referring to FIG. 2, the scanning method may be divided into a passive scanning method 200 and an active scanning method 250.

Referring to FIG. 2(A), the passive scanning method 200 may be performed by a beacon frame 230 that is periodically broadcasted by an AP 210. The AP 210 in a WLAN broadcasts the beacon frame 230 to a non-AP STA 240 every 100 msec. The beacon frame 230 may include information about a current network. The non-AP STA 240 may receive network information by receiving the periodically broadcasted beacon frame 230 and perform scanning on the AP 210 that will perform authentication/association processes and a channel.

The passive scanning method 200 has only to receive the beacon frame 230 transmitted by the AP 210 without a need for the non-AP STA 240 to transmit a frame. Accordingly, the passive scanning method 200 is advantageous in that overall overhead generated due to the transmission/reception of data in a network is small. However, the passive scanning method 200 is disadvantageous in that the time taken to perform scanning is increased because scanning needs to be manually performed in proportion to the cycle of the beacon frame 230.

Referring to FIG. 2(B), the active scanning method 250 refers to a method in which a non-AP STA 290 initiatively performs scanning by sending a probe request frame 270 to an AP 260.

The AP 260 may receive the probe request frame 270 from the non-AP STA 290, wait for a random time in order to prevent a frame collision, and then transmit a probe response frame 280, including network information, to the non-AP STA 290. The non-AP STA 290 may obtain the network information based on the received probe response frame 280 and stop the scanning process.

The active scanning method 250 is advantageous in that the time used in scanning is short because the non-AP STA 290 initiatively performs scanning. However, the active scanning method 250 is disadvantageous in that network overhead for the transmission and reception of frames is increased because the non-AP STA 290 has to transmit the probe request frame 270. The probe request frame 270 is disclosed in IEEE 802.11 8.3.3.9 paragraph, and the probe response frame 280 is disclosed in IEEE 802.11 8.3.3.10.

After scanning is terminated, the AP and the STA may perform authentication and association processes.

Figure 3:
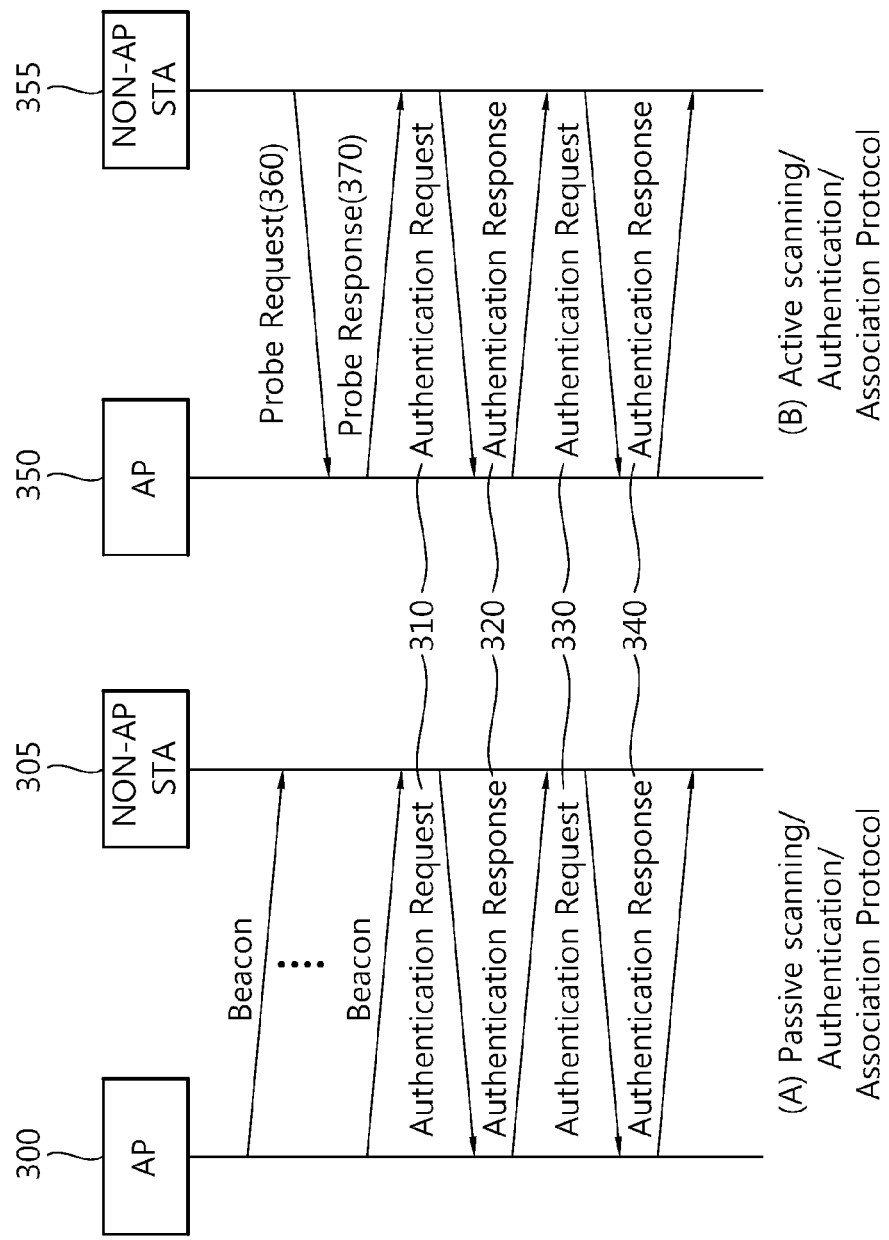
FIG. 3 is a conceptual diagram showing authentication and association processes after the scanning of an AP and an STA.

FIG. 3 is a conceptual diagram showing authentication and association processes after the scanning of an AP and an STA.

Referring to FIG. 3, after performing passive/active scanning, authentication and association may be performed with one of scanned APs.

The authentication and association processes may be performed through 2-way handshaking. FIG. 3(A) is a conceptual diagram showing an authentication and association processes after passive scanning, and FIG. 3(B) is a conceptual diagram showing an authentication and association processes after active scanning The authentication and association processes may be identically performed by exchanging an authentication request frame 310/authentication response frame 320 and an association request frame 330/association response frame 340 between APs 300 and 350 and respective non-AP STAs 305 and 355 irrespective of whether the active scanning method or the passive scanning method is used.

The authentication process may be performed when the non-AP STAs 305 and 355 transmit the authentication request frame 310 to the respective APs 300 and 350. In response to the authentication request frame 310, the APs 300 and 350 may transmit the authentication response frame 320 to the respective non-AP STAs 305 and 355. The format of the authentication frame has been disclosed in IEEE 802.11 8.3.3.11.

The association process may be performed when the non-AP STAs 305 and 355 transmit the association request frame 330 to the respective APs 300 and 305. In response to the association request frame 330, the APs 305 and 355 may transmit the association response frame 340 to the respective non-AP STAs 300 and 350. The transmitted association request frame 330 includes information about the capability of the non-AP STAs 305 and 355. The APs 300 and 350 may determine whether or not the non-AP STAs 305 and 355 may be supported based on the capability information of the non-AP STAs 305 and 355. If support is possible, the APs 300 and 350 may transmit the association response frame 340, including information about whether or not to accept the association request frame 330, a reason thereof, and supportable capability information, to the non-AP STAs 305 and 355. The format of the association frame has been disclosed in IEEE 802.11 8.3.3.5/8.3.3.6.

If up to the association step has been performed, data is subsequently transmitted and received normally. If association has not been performed, association may be performed again based on a reason on which the association has not been performed or association with another AP may be performed.

In general, in a WLAN environment, in order to perform link adaptation, an MCS may be determined using open-loop rate adaptation. For example, if the same modulation method is assumed to be used, the open-loop rate adaptation is a method of controlling the coding rate without the feedback of channel conditions. If the open-loop rate adaptation is used, transmission starts from a low coding rate. If a frame is transmitted without an error (e.g., if a transmission terminal that has sent a frame receives ACK transmitted by a reception terminal), a frame using an MCS of a high index using a high coding rate may be transmitted. In contrast, if an error occurs in a transmitted frame, a frame using a low MCS index having a coding rate may be transmitted.

Hereinafter, in an embodiment of the present invention, a low MCS (or a low MCS index) is an MCS method used when channel conditions are not good and is a method of transmitting data, modulated using a modulation scheme of a low bit/symbol or subject to channel coding at a low coding rate, at a low transfer rate. A high MCS (or a high MCS index) is an MCS method used when channel conditions are good and is a method of transmitting data, modulated using a modulation scheme of a high bit/symbol or subject to channel coding at a high coding rate, at a high transfer rate.

Referring to the active scanning method described with reference to FIG. 3, while performing scanning/authentication/association processes, multiple management frames, such as the probe request frame 360, the probe response frame 370, the authentication request frame 310, the authentication response frame 320, the association request frame 330, and the association response frame 340, are transmitted and received between the APs and the non-AP STAs. A lot of time is wasted in order to perform such processes.

In existing scanning/authentication/association processes, a process of obtaining channel state information is not performed. Accordingly, an STA and an AP perform scanning/authentication/association processes using the lowest MCS irrespective of a channel state. In such a case, there is a problem in that throughput is reduced in the initial step of performing access between the AP and the STA.

An embodiment of the present invention discloses a method of transmitting and receiving frames using an MCS that is suitable for a channel state in scanning/authentication/association processes, thereby improving data throughput in the initial step of performing access between an AP and an STA.

Figure 4:
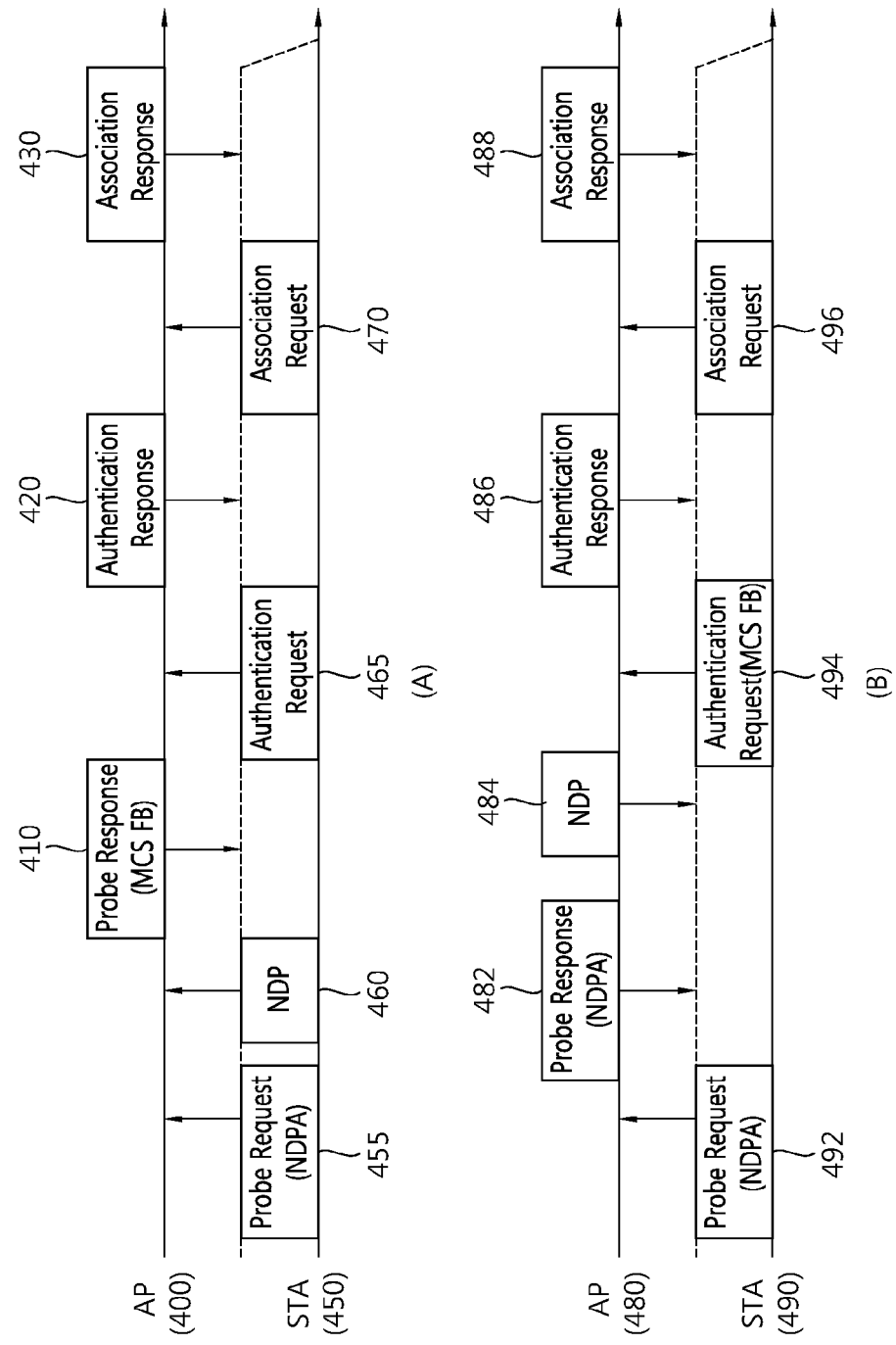
FIG. 4 is a conceptual diagram showing a link adaptation method in accordance with an embodiment of the present invention.

FIG. 4 is a conceptual diagram showing a link adaptation method in accordance with an embodiment of the present invention.

Referring to FIG. 4(A), link adaptation may be performed using a probe request frame 455 as the role of an NDPA frame.

An STA 450 may transmit the probe request frame 455 for performing active scanning to an AP 400.

In accordance with an embodiment of the present invention, the probe request frame 455 may play the same role as an NDPA frame because the NDPA element is added as an information element of the probe request frame 455. The newly defined information element of the probe request frame 455 is additionally described below. That is, channel state information becomes aware in a process of exchanging initial connection management frames so that an MCS can be applied from a scanning step.

The STA 450 sends an NDP frame 460 to the AP 400.

After sending the probe request frame 455 that plays a role as the NDPA frame to the AP 400, the STA 450 may transmit the NDP frame 460. The NDP frame 460 may be used for the AP 400 that has received the NDP frame 460 to feed back a channel state.

The AP 400 sends a probe response frame 410 to the STA 450.

An MCS Feedback (FB) Element may be added to the probe response frame 410, transmitted from the AP 400 to the STA 450, as a new information element. The MCS FB element may include an MCS FB value calculated based on the NDP frame 460. The newly defined information element of the probe response frame 410 is additionally described below.

The STA 450 sends an authentication request frame 465 to the AP 400.

The STA 450 may transmit the authentication request frame 465, generated based on the MCS value fed back through the probe response frame 410, to the AP 400. That is, unlike in a method of sending the authentication request frame using a low MCS irrespective of a channel state, the authentication request frame is transmitted by adaptively changing an MCS according to channel conditions, thereby being capable of increasing the transfer rate and data throughput.

The AP 400 sends an authentication response frame 420 to the STA 450.

The authentication response frame 410 may be generated based on the same MCS as that of the authentication request frame 465 and transmitted.

The STA 450 sends an association request frame 470 to the AP 400. In response thereto, the AP 400 sends an association response frame 420 to the STA 450.

The association request frame 470 and the association response frame 430 may also be generated based on the MCS value fed back through the probe response frame 410 and transmitted.

In accordance with another embodiment of the present invention, a probe response frame may play a role as an NDPA frame and receive MCS feedback from an STA.

Referring to FIG. 4(B), link adaptation may be performed using a probe response frame 482 as a role of an NDPA frame.

(1) An STA 490 may transmit a probe request frame 492 for performing active scanning to an AP 480.

(2) In response to the probe request frame 492, the AP 480 sends a probe response frame 482 to the STA 490.

In accordance with an embodiment of the present invention, an NDPA element may be added as an information element of the probe response frame 482 so that the probe response frame 482 plays the same role as the NDPA frame. That is, channel state information becomes aware in a process of exchanging initial connection management frames so that an MCS can be applied from a scanning step.

(3) The AP 480 sends an NDP frame 484 to the STA 490.

The AP 480 may transmit the NDP frame 484 to the STA 490 after a specific time since the probe response frame 482 is transmitted. The NDP frame 484 may be used for the AP 480 that has received the NDP frame 484 to feed back a channel state.

(4) The STA 490 sends an authentication request frame 494 to the AP 480.

An MCS FB element may be added to the authentication request frame 494, transmitted from the STA 490 to the AP 480, as a new information element. The MCS FB element may include an MCS FB value calculated based on the NDP frame 484.

(5) The AP 480 sends an authentication response frame 486, generated based on the MCS value fed back through the authentication request frame 494, to the STA 490.

That is, unlike in a method of sending the authentication response frame 486 using a low MCS irrespective of a channel state, the authentication response frame 486 is transmitted by adaptively changing an MCS according to channel conditions, thereby being capable of increasing the transfer rate and data throughput.

(6) The STA 490 sends an association request frame 496 to the AP 480. In response thereto, the AP 480 sends an association response frame 488 to the STA 490.

Each of the association request frame 496 and the association response frame 488 may also be generated based on the MCS value fed back through the probe response frame 482 and transmitted.

That is, in the link adaptation method in accordance with an embodiment of the present invention, an NDPA element may be included as an information element of a probe request frame or a probe response frame that belongs to management frames used in scanning/association/authentication processes, the probe request frame or the probe response frame may be transmitted, and an NDP frame may be transmitted after a specific time. A reception terminal may compute MCS feedback based on a received NDP frame, and the computed MCS feedback may be included as an information element of a management frame and then transmitted to a transmission terminal that has transmitted the NDP frame. Accordingly, frames to which an MCS has been applied can be transmitted and received in scanning/association/authentication steps.

Figure 5:
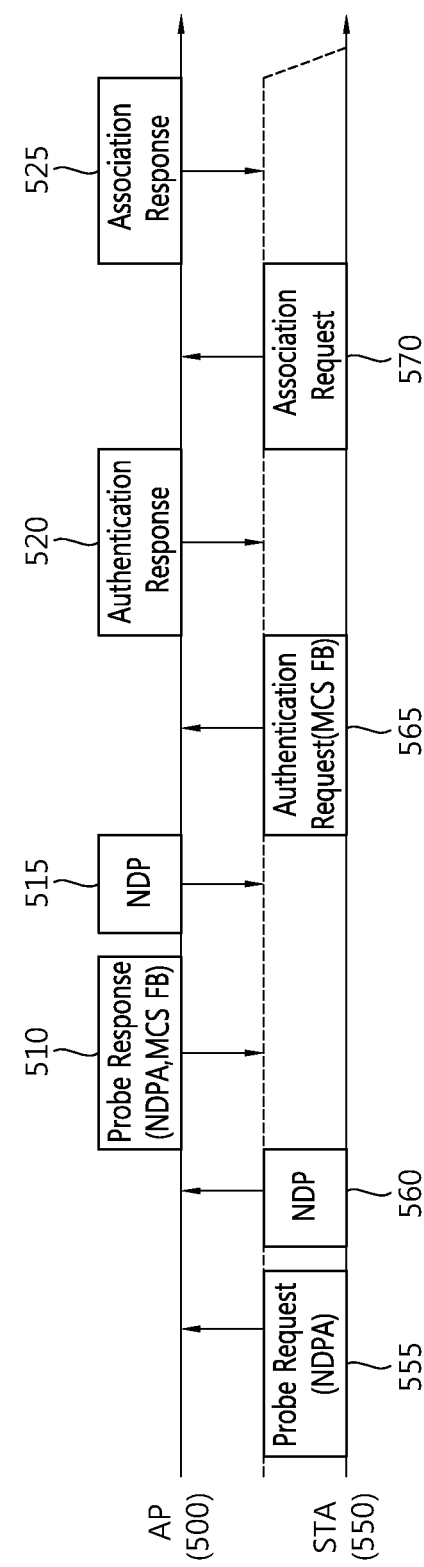
FIG. 5 is a conceptual diagram showing a link adaptation method in accordance with an embodiment of the present invention.

FIG. 5 is a conceptual diagram showing a link adaptation method in accordance with an embodiment of the present invention.

Referring to FIG. 5, a plurality of link adaptation methods may be performed in scanning/association/authentication processes by using a probe request frame 555 as a role of an NDPA frame and also using a probe response frame 510 as a role of an NDPA frame.

An STA 550 may transmit the probe request frame 555 for performing active scanning to an AP 500.

When an NDPA element is added as an information element of the probe request frame 555 as in FIG. 4, the probe request frame 555 may play the same role as the NDPA frame. The newly defined information element of the probe request frame 555 is additionally described below.

The STA 550 sends an NDP frame 560 to the AP 500.

After sending the probe request frame 555 that plays a role as the NDPA frame, the STA 550 may transmit an NDP frame 560 to the AP 500. The NDP frame 560 may be used for the AP 500 that has received the NDP frame 560 to feed back a channel state.

The AP 500 sends the probe response frame 510 to the STA 550.

An MCS FB element and an NDPA element may be added to the probe response frame 510, transmitted from the AP 500 to the STA 550, as new information elements.

An MCS FB value calculated based on the NDP frame 560 transmitted by the STA 550 may be transmitted to the STA 550 using the MCS FB element. Furthermore, like in the probe request frame 555, an NDPA element may be added to the probe response frame 510 as an information element and transmitted, and thus link adaptation may be performed again. The newly defined information element of the probe response frame 510 is additionally described below.

The AP 500 sends an NDP frame 515 to the STA 550.

After sending the probe response frame 510 that plays a role as an NDPA frame, the AP 500 may transmit the NDP frame 515 to the STA 550. The NDP frame 515 may be used for the STA that has received the NDP frame 515 to feed back a channel state.

The STA 550 sends an authentication request frame 565 to the AP 500.

The STA 550 may include an MCS, measured based on the NDP frame 560 transmitted by the AP 500, as an information element of the authentication request frame 565 and transmit the authentication request frame 565. Unlike in FIG. 4, in FIG. 5, a link adaptation process may be performed twice in the scanning/authentication/association processes. The newly defined information element of the authentication request frame 565 is additionally described below.

The AP 500 sends an authentication response frame 520 to the STA 550.

The authentication response frame 520 may be generated based on the MCS fed back through the authentication request frame 565 and transmitted to the STA 550.

The STA 550 sends an association request frame 570 to the AP 500. In response thereto, the AP 500 sends an association response frame 525 to the STA 550. Each of the association request frame 570 and the association response frame 525 may also be generated based on the MCS fed back through the authentication request frame and transmitted.

That is, in the link adaptation method in accordance with an embodiment of the present invention, an NDPA element may be included in a management frame used in scanning/association/authentication processes and transmitted, and after a specific time, an NDP frame may be transmitted. After an authentication request frame is included, a frame also includes an NDPA element, channel information may be measured, an MCS FB value may be received, and link adaptation may be additionally performed. Such an embodiment is also included in the scope of the present invention.

The management frames transmitted and received in the association/authentication steps may be transmitted using Multiple Input Multiple Output (MIMO) as well as using Single Input Single Output (SISO).

Figure 6:
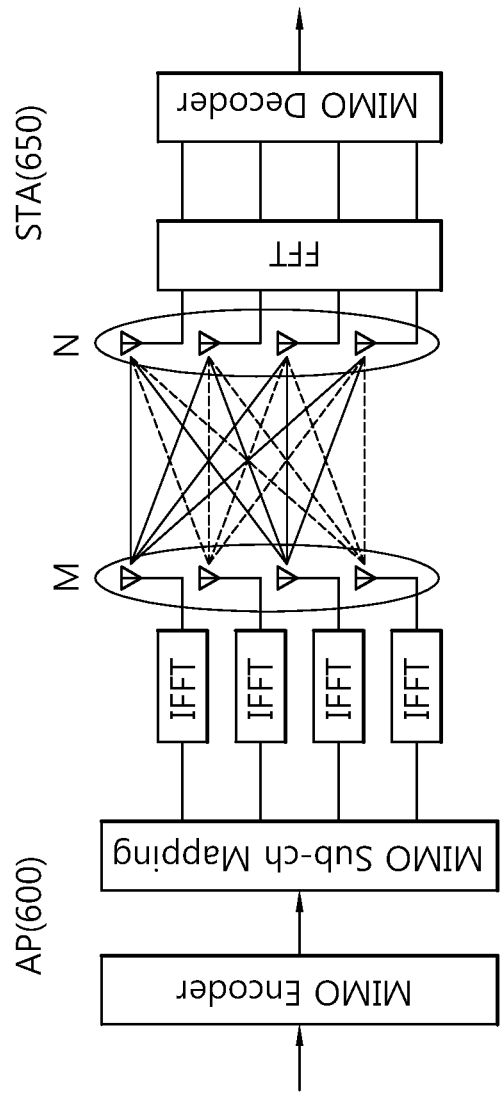
FIG. 6 is a conceptual diagram showing a link adaptation method using SU-MIMO in accordance with an embodiment of the present invention.

FIG. 6 is a conceptual diagram showing a link adaptation method using SU-MIMO in accordance with an embodiment of the present invention.

Referring to FIG. 6, it is assumed that an AP 600 performs data transmission using four antennas and an STA 650 performs data transmission using four antennas based on Single User (SU)-MIMO. If SU-MIMO is used, a plurality of different data streams transmitted by the AP 600 may be transmitted to the single STA 650. If all the four antennas are used in spatial multiplexing, four transmission channels are present between the AP 600 and the STA 650.

If association is performed between the AP 600 and the STA 650 using SU-MIMO, the number of spatial streams used to transmit and receive frames and an MCS index according to channel conditions in which each of the spatial streams is transmitted may be included in MCS feedback information. That is, the MCS feedback information may be information about the Signal to Noise Ratio (SNR) of a channel in a Single Input Single Output (SISO) environment and may include the number of spatial streams and the MCS of each stream that may be used for data transmission in an MIMO environment.

For example, in FIG. 4, the AP 600 may determine channel state information about all available MIMO transmission stream channels based on an NDP frame transmitted after a probe request frame including an NDPA element, determine the number of spatial streams to be used to obtain spatial diversity when performing transmission and reception, compute optimum MCS information according to each stream, include the computed optimum MCS information as an information element of a probe response frame, and feed back the probe response frame to the STA 650. In transmitting and receiving data using SU-MIMO, additional feedback information may be received and beamforming may be used.

Figure 7:
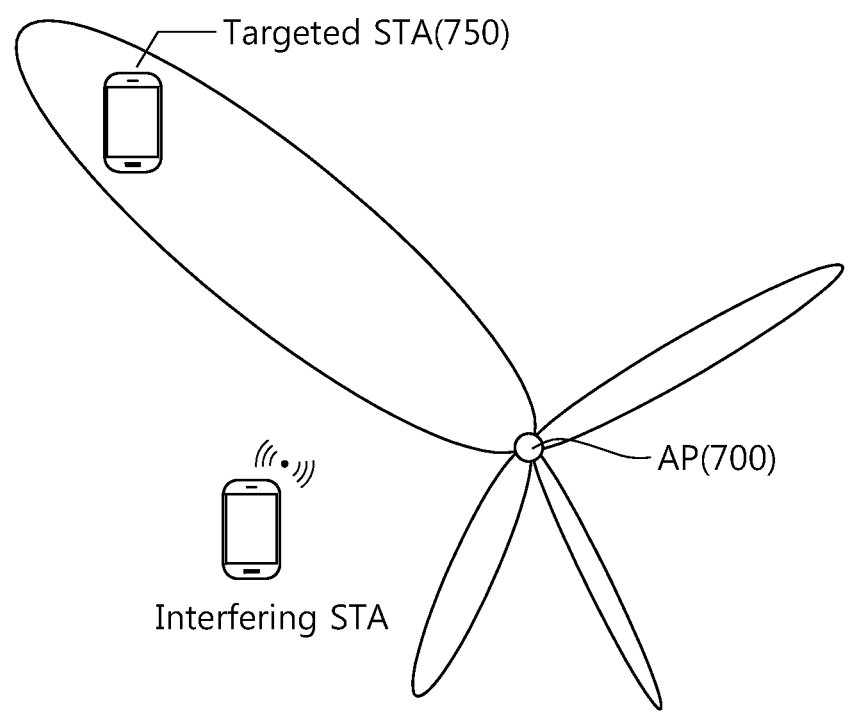
FIG. 7 is a conceptual diagram showing a data transmission and reception method using beamforming in accordance with an embodiment of the present invention.

FIG. 7 is a conceptual diagram showing a data transmission and reception method using beamforming in accordance with an embodiment of the present invention.

Referring to FIG. 7, an AP 700 sends data to a specific STA 750 using beamforming by concentrating transmission power on the specific STA 750, thereby being capable of increasing the utilization efficiency of a medium and data throughput.

If transmission is performed using beamforming, the aforementioned NDP frame may be used to compute sounding feedback including feedback information for beamforming If only beamforming is used without using MIMO, an MCS FB element may not be used, but only a sounding feedback element may be used. If MIMO is used, however, the spatial stream of each channel may be transmitted using an MCS FB element additionally.

FIG. 7 shows data transmission using beamforming based on a single spatial stream without performing MIMO.

Assuming that the link adaptation described with reference to FIG. 4 is performed using beamforming, the STA 750 may transmit a probe request frame, including an NDPA information element, to the AP 700 and then transmit an NDP frame after an SIFS. The AP 700 may perform channel sounding for beamforming based on the NDP frame. The AP 700 may compute a channel sounding result, include a sounding feedback element as an information element of a probe response frame in the probe response frame, and transmit the probe response frame. The STA 750 may also perform transmission using beamforming when performing transmission to the AP 700.

If beamforming is used, a transmitted sounding feedback information element may include a field including feedback information, such as a compressed beamforming report field. The compressed beamforming report field may include, for example, the beamforming feedback matrix of each subcarrier index, information about the average SNR of a spatial stream used in beamforming, etc.

The STA 750 that has received the probe response frame may determine the radiation pattern of an antenna, antenna transmission power, etc. in transmitting an authentication request frame based on the sounding feedback information included in the information element and perform beamforming In response to the authentication request frame, the AP 700 may also transmit an authentication response frame using beamforming based on the calculated sounding feedback information.

That is, an NDPA element may be included as an information element of a management frame used in scanning/association/authentication processes in accordance with an embodiment of the present invention and transmitted, and an NDP frame may be transmitted after a specific time. A reception terminal may compute sounding feedback based on the received NDP frame, and the computed sounding feedback may be included in a management frame as an information element of the management frame, transmitted to a transmission terminal that has transmitted the NDP frame and used for beamforming FIG. 8 is a conceptual diagram showing a data transmission and reception method using beamforming in accordance with an embodiment of the present invention.

Figure 8:
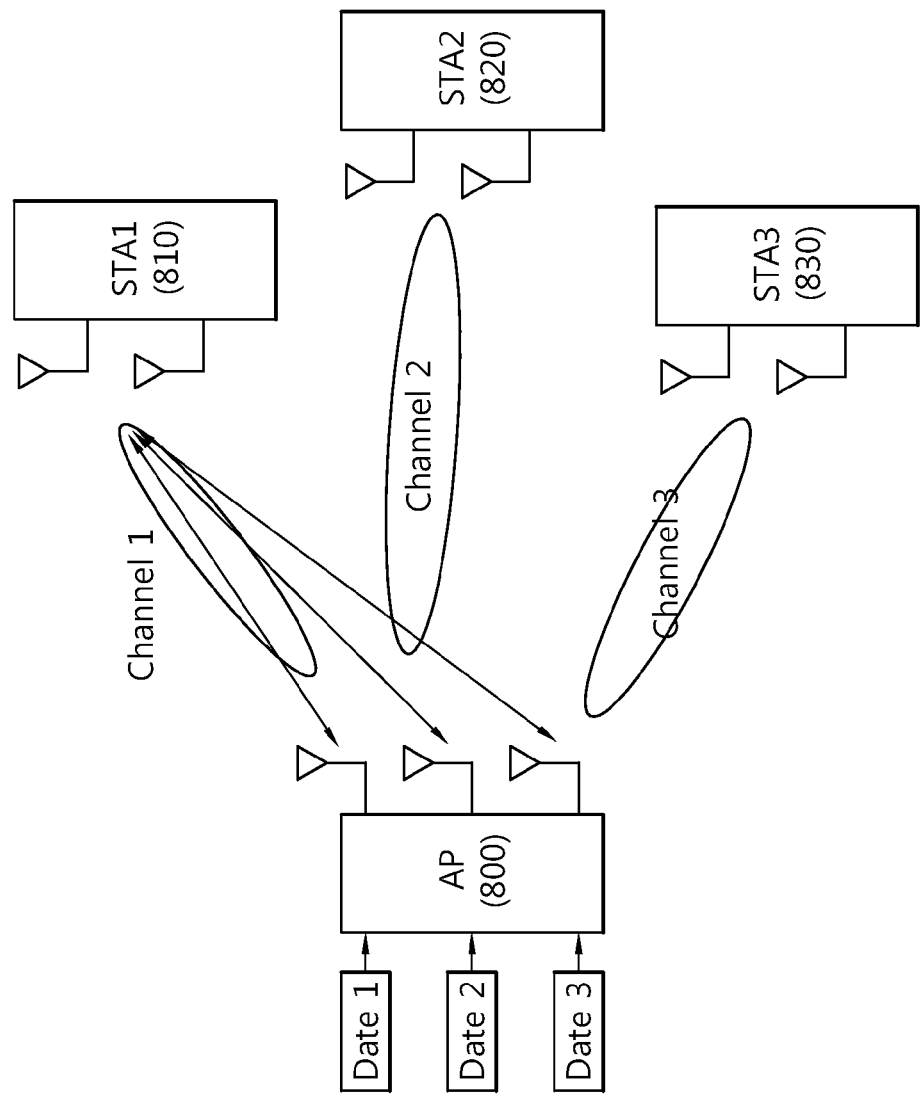
FIG. 8 is a conceptual diagram showing a data transmission and reception method using beamforming in accordance with an embodiment of the present invention.

Referring to FIG. 8, an AP 800 and an STA may perform beamforming while performing SU-MIMO. In SU-MIMO using beamforming, both MCS feedback information and sounding feedback information may be used as feedback information.

For example, it may be assumed that the number of antennas of the AP 800 is 3 and the number of antennas of each of STAs 810, 820, and 830 is 2.

The STA 810 may include an NDPA element in a probe request frame as an information element of the probe request frame and transmit the probe request frame. After an SIFS, the STA 810 may transmit an NDP frame to the AP 800 for sounding feedback and MCS feedback.

The AP 800 may compute MCS feedback information and sounding feedback information based on the received NDP frame. The MCS feedback information and the sounding feedback information may be included in a probe response frame and transmitted to the STA 810.

The MCS feedback information transmitted to the STA 810 may include, for example, the number of spatial streams that may be used for MIMO and MCS information about each spatial stream. The sounding feedback information may include feedback information, such as a compressed beamforming report field. The compressed beamforming report field may include, for example, the beamforming feedback matrix of each subcarrier index, information about the average SNR of each spatial stream used in beamforming, etc. If redundant information is present in two pieces of feedback information, corresponding information may be included in one piece of feedback information and transmitted.

The STA 810 that has received the MCS feedback information and the sounding feedback information included in the probe response frame may transmit an authentication request frame to the AP 800 through an SU-MIMO operation using beamforming based on the feedback information.

A method in which an AP and an STA performs beamforming while performing SU-MIMO has been disclosed in FIG. 8, but Multi-User (MU) MIMO may be performed between a single AP and a plurality of STAs.

That is, in the link adaptation method in accordance with an embodiment of the present invention, an NDPA element may be included in a management frame as an information element of the management frame used in scanning/association/authentication processes and transmitted, and an NDP frame may be transmitted after a specific time. A reception terminal may compute MCS feedback and sounding feedback based on the received NDP frame. The computed MCS feedback and sounding feedback may be included in a management frame as an information element of the management frame, transmitted to a transmission terminal that has transmitted the NDP frame, and used in link adaptation and beamforming for a plurality of spatial streams.

Hereinafter, an embodiment of the present invention illustrates elements added to an information element according to a role of a management frame used in scanning/association/authentication processes.

For convenience of description, it is assumed that a probe request frame plays a role as an NDPA frame. It is assumed that a probe response frame plays a role as an NDPA frame again and performs MCS feedback and sounding feedback on the NDPA information element of the probe request frame. It is assumed that an authentication request frame performs MCS feedback and sounding feedback on the NDPA element of the probe request frame. Such an embodiment is only a single example. If a role performed by a corresponding frame is partially limited, only an information element for performing the corresponding role may be included in a management frame.

The probe request frame that plays a role as the NDPA frame, transmitted by an STA used in a scanning step, may include information elements, such as those of Table 1 below.

TABLE 1

| order | Element |
|---|---|
| 1 | SSID |
| 2 | Supported rates |
| 3 | Request Information |
| 4 | Extended Supported Rates |
| 5 | DS Parameter Set |
| 6 | Supported Operating Classes |
| 7 | HT Capabilities |
| 8 | 20/40 BSS Coexistence |
| 9 | Extended Capability |
| 10 | NDPA |
| Last | Vender Specific |

Referring to Table 1, NDPA may be newly defined and included as an information element that is included in the data field of a prove request frame. Order of the information elements in Table 1 is random and may be changed. The information elements may indicate pieces of information included in the frame body of a frame. Each of the information elements of the probe request frame has been disclosed in IEEE 802.11 8.3.3.9.

Even when the probe response frame plays a role as the NDPA frame as in FIG. 4(B), NDPA may be additionally added to the information elements of the probe response frame.

Figure 9:
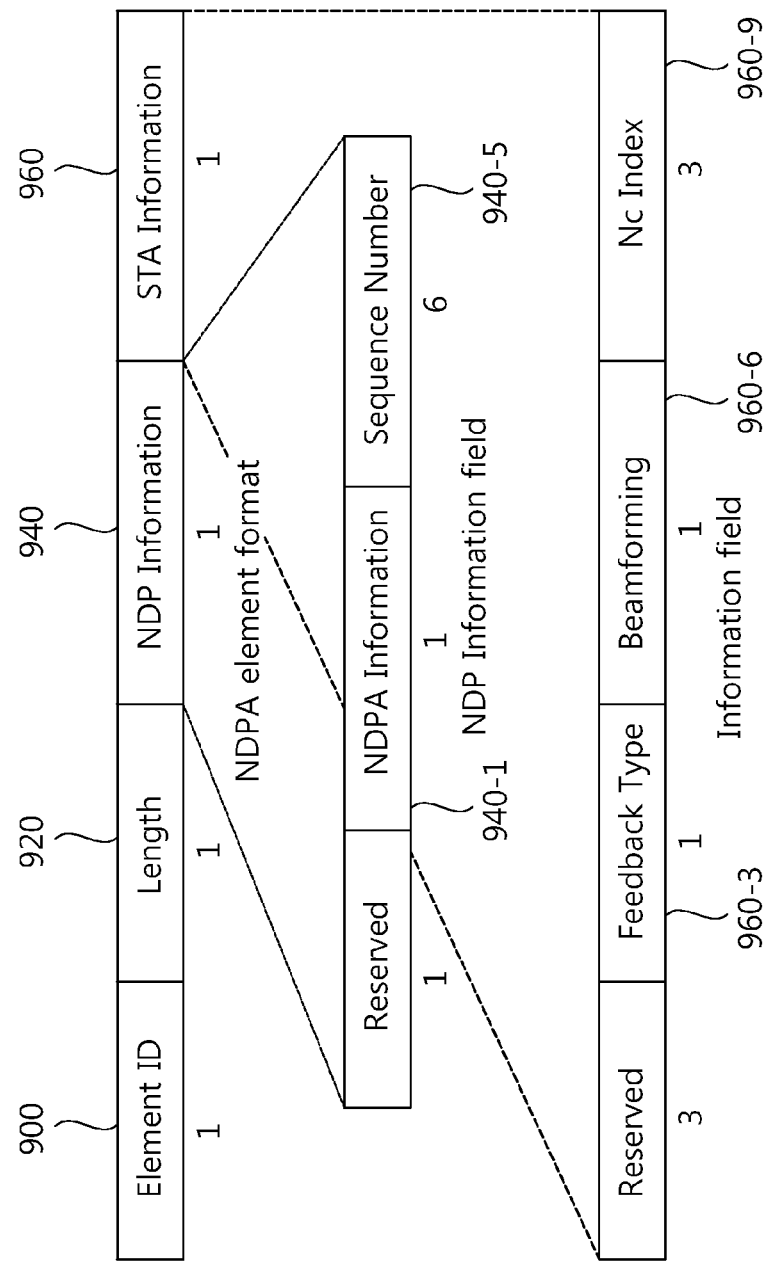
FIG. 9 is a conceptual diagram showing an NDPA element format in accordance with an embodiment of the present invention.

FIG. 9 is a conceptual diagram showing an NDPA element format in accordance with an embodiment of the present invention.

Referring to FIG. 9, the NDPA element format may include an element ID 900, a length 920, NDP information 940, and STA information 960.

The element ID 900 is a value indicating that an information element is what information and may be assigned to a bit of octet (8).

The length 920 is a value indicative of the length of an information element and may be assigned to a bit of 1 octet.

The NDP information 940 may include NDPA indication 940-1 and a sequence number 940-5. The NDPA indication 940-1 may indicate that a frame is a frame playing a role as an NDPA frame. The sequence number 940-5 is information that may be used when an NDP frame performs the role of sounding and may include sounding sequence number information. If an NDP frame does not play a role for computing sounding feedback, but plays a role for only MCS feedback, a corresponding bit may be use to transfer another information. Furthermore, if link adaptation is performed twice in scanning/authentication/association processes as in FIG. 5, an NDPA frame may also be included in the information elements of the probe response frame.

The STA information 960 may include a feedback type 960-3, beamforming 960-6, and an Nc index 960-9. The feedback type 960-3 may include information about whether feedback for an NDP frame will be used for feedback for a single user or feedback for multiple users. The beamforming 960-6 may include information about whether or not to perform beamforming when MIMO is used. If an NDPA frame is received, whether or not to perform feedback for beamforming may be determined based on the beamforming 960-6. The Nc Index 960-9 may include a feedback dimension necessary when performing beamforming The STA information 960 may not be used when a reception terminal is provided with only MCS feedback based on an NDP frame without performing beamforming In a scanning step, an AP may include feedback information about an NDP frame transmitted by an STA in an information element and send the feedback information as a probe response frame.

Tables 2 to 4 show the information elements of a probe response frame which include MCS feedback and sound feedback in information elements in order to perform feedback and include an NDPA frame in order to play a role as an NDPA frame.

TABLE 2

| order | Element |
| --- | --- |
| 1 | Timestamp |
| 2 | Beacon Interval |
| 3 | Capability |
| 4 | SSID |
| 5 | Supported rates |

TABLE 2-continued

| order | Element |
| --- | --- |
| 6 | FH Parameter Set |
| 7 | DS Parameter Set |
| 8 | CF Parameter Set |
| 9 | IBSS Parameter Set |
| 10 | Country |
| 11 | FH Parameters |
| 12 | FH Pattern Table |
| 13 | Power Constraint |
| 14 | Channel Switch Announcement |
| 15 | Quiet |

TABLE 3

| order | Element |
| --- | --- |
| 16 | IBSS DFS |
| 17 | TPC Report |
| 18 | ERP |
| 19 | Extended Supported Rates |
| 20 | RSN |
| 21 | BSS Load |
| 22 | EDCA Parameter Set |
| 23 | Measurement Pilot Transmission |
| 24 | Multiple BSSID |
| 25 | RM Enabled Capabilities |
| 26 | AP Channel Report |
| 27 | BSS Average Access Delay |
| 28 | Antenna |
| 29 | BSS Available Admission Capacity |
| 30 | BSS AC Access Delay |
| 31 | Mobility domain |

TABLE 4

| order | Element |
| --- | --- |
| 32 | DSE registered location |
| 33 | Extended Channel Switch Announcement |
| 34 | Supported Operating Classes |
| 35 | HT Capabilities |
| 36 | HT Operation |
| 37 | 20/40 BSS Coexistence |
| 38 | Overlapping BSS Scan Parameter |
| 39 | Extended Capabilities |
| 40 | NDPA |
| 41 | MCS Feedback |
| 42 | Sounding Feedback |
| Last-1 | Vendor Specific |
| Last-n | Request element |

Referring to Tables 2 to 4, NDPA may be included in order 40, MCS feedback may be included in order 41, and sounding feedback may be included in order 42. The information elements may include only some information elements of the NDPA, the MCS feedback, and the sounding feedback depending on a role of a probe request frame.

For example, if a probe response frame is used as the role of NDPA, only the NDPA other than the MCS feedback and the sounding feedback may be included in the information elements. For another example, if a probe response frame that does not play a role as NDPA as a probe request frame, but plays a role as NDPA and function to perform MCS feedback on an NDP frame, only the MCS feedback may be included as an information element.

Furthermore, if a probe response frame plays a role as an NDPA frame as in FIG. 4(B), an authentication request frame may function to transmit MCS feedback information to an AP. In such a case, the MCS feedback or the sounding feedback may be additionally included in the information elements of the authentication request frame.

Figure 10:
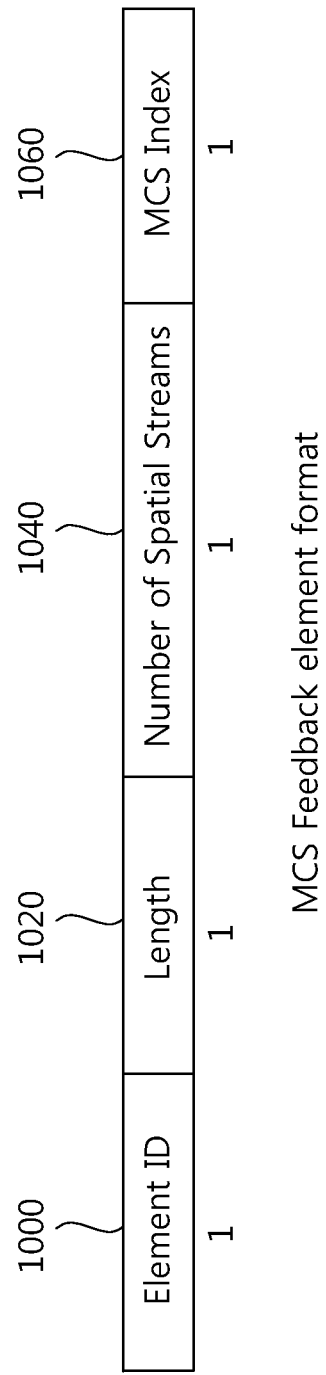
FIGS. 10 and 11 are conceptual diagrams showing an MCS feedback information element and a sounding feedback element in accordance with an embodiment of the present invention.
Figure 11:
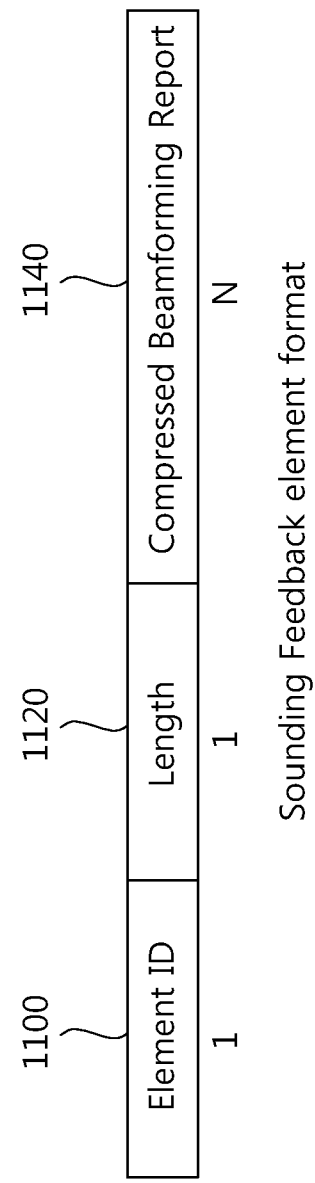

FIGS. 10 and 11 are conceptual diagrams showing an MCS feedback information element and a sounding feedback element in accordance with an embodiment of the present invention.

Referring to FIG. 10, the MCS feedback information element may include an element ID 1000, a length 1020, the number of spatial streams 1040, and an MCS index 1060.

The element ID 1000 includes information about the ID of the MCS feedback information element, and the length 1020 includes information about the length of the MCS feedback information element. The number of spatial streams 1040 may include information about the number of spatial streams that may be used when MIMO is used, and the MCS index 1060 may include information about an MCS index that may be used when transmission is performed through the channel of a spatial stream.

Referring to FIG. 11, the sounding feedback information element may include an element ID 1100, a length 1120, and a compressed beamforming report 1140.

The element ID 1100 includes information about the ID of the sounding feedback information element, and the length 1120 includes information about the length of the sounding feedback information element. The compressed beamforming report 1140 may include feedback information for performing beamforming, such as the Signal to Noise Ratio (SNR) of each spatial-time stream and a beamforming feedback matrix.

Table 5 shows the information elements of an authentication request frame for performing MCS feedback and sounding feedback on the NDPA element of a probe request frame.

TABLE 5

| order | Element |
|---|---|
| 1 | SSID |
| 2 | Supported rates |
| 3 | Request Information |
| 4 | Extended Supported Rates |
| 5 | DS Parameter Set |
| 6 | Supported Operating Classes |
| 7 | HT Capabilities |
| 8 | 20/40 BSS Coexistence |
| 9 | Extended Capability |
| 10 | MCS Feedback |
| 11 | Sounding Feedback |
| Last | Vendor Specific |

Referring to Table 5, MCS feedback may be included in order 10, and sounding feedback may be included in order 11. Based on an NDP frame transmitted after a specific time since a probe response frame that plays a role as NDPA is transmitted, an AP may compute MCS feedback and sounding feedback, include the computed MCS feedback and sounding feedback in the information elements, and send the information elements to the STA.

Figure 12:
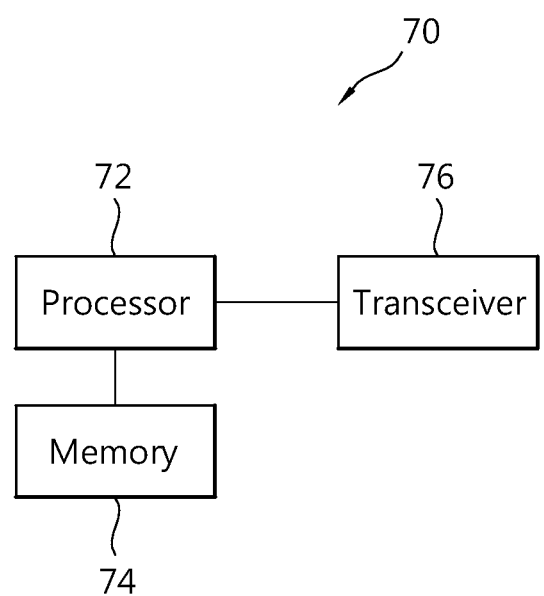
FIG. 12 is a block diagram showing a wireless apparatus to which an embodiment of the present invention may be applied.

FIG. 12 is a block diagram showing a wireless apparatus to which an embodiment of the present invention may be applied.

The wireless apparatus 70 is a terminal capable of implementing the aforementioned embodiments and may be an AP or a non-AP STA.

The wireless apparatus 70 includes a processor 72, memory 74, and a transceiver 76. The transceiver 76 transmits/receives radio signals, and the physical layer of IEEE 802.11 is implemented in the transceiver 76. The processor 72 is functionally connected to the transceiver 76 and implements the MAC layer and physical layer of IEEE 802.11. The processor 72 may generate frames in accordance with an embodiment of the present invention. The transceiver 76 may transmit a probe request frame including a Null Data Packet Announcement (NDPA) information element, transmit a Null Data Packet (NDP) frame including only a Physical Layer Convergence Protocol (PLCP) header after transmitting the probe request frame, and receive a probe response frame including a feedback information element computed based on the NDP frame. That is, each of the elements of the wireless apparatus 70 may be implemented to practice the present invention.

The processor 72 and/or the transceiver 76 may include Application-Specific Integrated Circuits (ASICs), other chipsets, logic circuits and/or data processors. The memory 74 may include Read-Only Memory (ROM), Random Access Memory (RAM), flash memory, memory cards, storage media and/or other storage devices. When the above-described embodiment is embodied in software, the above-described scheme may be embodied into a module (process or function) that performs the above function. The module may be stored in the memory 74 and executed by the processor 72. The memory 74 may be placed inside or outside the processor 72 and may be connected to the processor 72 using a variety of well-known means.

What is claimed is:

1. A method for performing link adaptation, the method comprising:

transmitting, by a station (STA), a probe request frame including a Null Data Packet (NDP) Announcement (NDPA) information element to an access point (AP), the NDPA information element including NDP information indicating whether the probe request frame is used as an NDPA frame;

transmitting, by the STA, an NDP including only a Physical Layer Convergence Protocol (PLCP) header to the AP after transmitting the probe request frame;

receiving, by the STA, a probe response frame from the AP including a feedback information element determined based on the NDP, the feedback information element including Modulation and Coding Scheme (MCS) feedback information when Multiple Input Multiple Output (MIMO) transmission is performed and including sounding feedback information when beamforming transmission is performed;

determining, by the STA, a radiation pattern and transmission power of antennas based on the MCS feedback information and the sounding feedback information; and transmitting, by the STA, an authentication request frame by using the determined radiation pattern and transmission power.

2. The method of claim 1, further comprising receiving, by the STA, the NDP from the AP after receiving the probe response frame if the probe response frame includes the NDPA information element.

3. The method of claim 1, wherein:

the NDPA information element further includes a feedback type indicator, a beamforming indicator, and an Nc index indicator;

the feedback type indicator indicates whether the MCS feedback information or sounding feedback information is transmitted to a single user or transmitted to multiple users;

the beamforming indicator indicating whether beamforming transmission is performed; and the Nc index indicator indicating a feedback dimension required when beamforming transmission is performed.

4. The method of claim 1, wherein the MCS feedback information includes a number of spatial streams used when MIMO transmission is performed and an MCS index indicating a channel state of each spatial stream.

5. The method of claim 1, wherein:
the sounding feedback information includes a compressed beamforming report field; and
the compressed beamforming report field includes a Signal to Noise Ratio (SNR) of each spatial stream when beamforming transmission is performed and at least one beamforming matrix of each subcarrier index.

6. A station (STA) for performing link adaptation, the STA comprising:
a transceiver configured to transmit or receive a radio frequency (RF) signal; and
a processor operatively connected to the transceiver and configured to:
transmit a probe request frame including a Null Data Packet (NDP) Announcement (NDPA) information element to an access point (AP), the NDPA information element including NDP information indicating whether the probe request frame is used as an NDPA frame;
transmit an NDP including only a Physical Layer Convergence Protocol (PLCP) header to the AP after transmitting the probe request frame;
receive a probe response frame from the AP including a feedback information element determined based on the NDP, the feedback information element including Modulation and Coding Scheme (MCS) feedback information when Multiple Input Multiple Output (MIMO) transmission is performed and including sounding feedback information when beamforming transmission is performed,
determine a radiation pattern and transmission power of antennas based on the MCS feedback information and the sounding feedback information; and
transmit an authentication request frame by using the determined radiation pattern and transmission power.

7. The STA of claim 6, wherein the processor is further configured to receive the NDP from the AP after receiving the probe response frame if the probe response frame includes the NDPA information element.

8. The STA of claim 6, wherein:
the NDPA information element further includes a feedback type indicator, a beamforming indicator, and an Nc index indicator;
the feedback type indicator indicates whether the MCS feedback information or sounding feedback information is transmitted to a single user or transmitted to multiple users;
the beamforming indicator indicates whether beamforming transmission is performed; and
the Nc index indicator indicates a feedback dimension required when beamforming transmission is performed.

9. The STA of claim 6, wherein the MCS feedback information includes a number of spatial streams used when MIMO transmission is performed and an MCS index indicating a channel state of each spatial stream.

10. The STA of claim 6, wherein:
the sounding feedback information includes a compressed beamforming report field; and
the compressed beamforming report field includes a Signal to Noise Ratio (SNR) of each spatial stream when beamforming transmission is performed and at least one beamforming matrix of each subcarrier index.

* * * * *